(12) United States Patent
Gier et al.

(10) Patent No.: US 9,469,940 B2
(45) Date of Patent: Oct. 18, 2016

(54) USE OF MODIFIED NANOPARTICLES IN WOOD MATERIALS FOR REDUCING THE EMISSION OF VOLATILE ORGANIC COMPOUNDS (VOCS)

(71) Applicant: Kronotec AG, Lucerne (CH)

(72) Inventors: Andreas Gier, Mandelbachtal (DE); Julia Borowka, Zary (PL); Joachim Hasch, Berlin (DE)

(73) Assignee: Kronotec AG, Lucerne (CH)

( * ) Notice: Subject to any disclaimer, the term of this patent is extended or adjusted under 35 U.S.C. 154(b) by 139 days.

(21) Appl. No.: 14/372,306

(22) PCT Filed: Dec. 21, 2012

(86) PCT No.: PCT/EP2012/076578
§ 371 (c)(1),
(2) Date: Jul. 15, 2014

(87) PCT Pub. No.: WO2013/107599
PCT Pub. Date: Jul. 25, 2013

(65) Prior Publication Data
US 2014/0363664 A1 Dec. 11, 2014

(30) Foreign Application Priority Data
Jan. 16, 2012 (EP) .................................... 12151240

(51) Int. Cl.
| | | |
|---|---|---|
| *B27N 1/00* | (2006.01) | |
| *D21H 17/13* | (2006.01) | |
| *C08J 5/24* | (2006.01) | |
| *C08L 97/02* | (2006.01) | |
| *B27K 3/00* | (2006.01) | |
| *B27K 5/00* | (2006.01) | |

(52) U.S. Cl.
CPC .............. *D21H 17/13* (2013.01); *B27K 3/007* (2013.01); *B27K 5/00* (2013.01); *B27K 5/007* (2013.01); *B27N 1/003* (2013.01); *C08J 5/24* (2013.01); *C08L 97/02* (2013.01); *B27K 2200/10* (2013.01); *B27K 2240/00* (2013.01); *Y10T 428/259* (2015.01); *Y10T 428/31663* (2015.04)

(58) Field of Classification Search
None
See application file for complete search history.

(56) References Cited

U.S. PATENT DOCUMENTS

| | | | |
|---|---|---|---|
| 3,959,195 A * | 5/1976 | Eriksson .................. | B27N 1/00 156/62.2 |
| 6,187,426 B1 | 2/2001 | Jonschker et al. | |
| 6,287,639 B1 | 9/2001 | Schmidt et al. | |
| 7,037,596 B1 * | 5/2006 | Benthien .................. | A61L 9/01 428/334 |
| 8,188,266 B2 | 5/2012 | Edelmann et al. | |
| 2009/0130474 A1 | 5/2009 | Ishimoto et al. | |
| 2011/0237713 A1 | 9/2011 | Grunwald et al. | |

FOREIGN PATENT DOCUMENTS

| | | |
|---|---|---|
| DE | 102006006655 A1 | 3/2007 |
| DE | 102007050935 A1 | 4/2009 |
| EP | 0842967 A2 | 5/1998 |
| EP | 2111959 A2 | 10/2009 |
| EP | 2447332 A1 | 5/2012 |
| JP | 51136803 A | 11/1976 |
| JP | 2001507085 A | 5/2001 |
| JP | 201064306 A | 3/2010 |
| JP | 2011506122 A | 3/2011 |
| WO | 2008113181 A1 | 9/2008 |
| WO | 2010136106 A1 | 12/2010 |

* cited by examiner

*Primary Examiner* — Mary F Theisen
(74) *Attorney, Agent, or Firm* — The Webb Law Firm

(57) ABSTRACT

The present invention relates to the use of modified nanoparticles in wood based panels, in particular OSB-panels for reduction of the emission of volatile organic compounds (VOCs). The invention further relates to a wood based panel containing the modified particles and to a method for producing such a wood based panel.

15 Claims, No Drawings

USE OF MODIFIED NANOPARTICLES IN WOOD MATERIALS FOR REDUCING THE EMISSION OF VOLATILE ORGANIC COMPOUNDS (VOCS)

CROSS-REFERENCE TO RELATED APPLICATIONS

This application is the United States national phase of International Application No. PCT/EP2012/076578 filed Dec. 21, 2012, and claims priority to European Patent Application No. 12151240.4 filed Jan. 16, 2012, the disclosures of which are hereby incorporated in their entirety by reference.

BACKGROUND OF THE INVENTION

1. Field of the Invention

The present application relates to the use of modified nanoparticles, a process for producing wood based panels using modified nanoparticles and a wood based panel producible in such a process.

2. Description of Related Art

As is known wood based panels consist of lignocellulose or lignocellulose containing materials, such as wood fibres or wood shavings. Lignocellulose comprises cellulose, hemicellulose and lignin as ingredients. Cellulose is a long chain macromolecule consisting of glucose units, hemicellulose is a short chain branched macromolecule of pentoses and lignin is a three-dimensional macromolecule of methoxyphenylpropane units. Cellulose and hemicellulose form the structural substance of the cell wall, while lignin as filling substance in the cell structure causes lignification.

In the course of producing wood based panels and in particular due to the production process of wooden shavings a multitude of volatile organic compounds are produced or released. Volatile organic substances, which easily evaporate or are already present as a gas at lower temperatures, as for example room temperature, belong to the volatile organic compounds also called VOCs.

All the compounds, which are highly volatile or already present in gaseous form at low temperatures belong to the highly volatile organic compounds. The boiling point of the organic compounds belonging to the VOCs is typically in a range between 50 to 260° C. However, the definition of VOCs is country specific and varies accordingly.

In particular when using construction products, such wood based panels in interior spaces the emission of highly volatile organic compounds constitutes a particular health relevant source of impact.

In Germany the health evaluation of emission of volatile organic compounds in interior spaces of buildings is carried out by the Committee for the Health Evaluation of Construction Products (AgBB). According to the criteria established by the Committee volatile organic compounds (VOC) comprise substances in the retention range $C_6$ to $C_{16}$ and low volatile organic compounds (SVOC) comprise substances in the retention range above $C_{16}$ to $C_{22}$. The highly volatile organic compounds (VOC) are thereby considered either as singular substance or in the sum as TVOC (total volatile organic compound).

The VOC emission of construction products is typically investigated in test chambers. The TVOC value of suitable construction products should be according to AgBB criteria after 3 days at 10 mg/m$^3$ or below and after 28 days at 1 mg/m$^3$ or below (AgBB evaluation scheme for VOC for wood construction products, 2010).

Comparable guidelines were established by the Bundesumweltamt according to which a VOC emission of less than 300 µg/m$^3$ is classified as hygienically harmless (Umweltbundesamt 2007, Bundesgesundheitsblatt 7, pages 999-1005).

In the wood processing industry the highly volatile organic aldehydes, such as formaldehyde or hexanal as well as the highly volatile terpenes are of particular importance.

Accordingly, the present application relates to the reduction of aldehydes and terpenes, in particular monoterpenes. Aldehyde, such as hexanal originate thereby either from the natural ingredients in the wood or from an oxidative degradation of natural fats. Terpenes are contained in the natural wood ingredient resin.

In general the volatile organic compounds result either as side products during the production process or they are released slowly during the use of the product to the ambient air. Those processes provide specific problems, which can increase the cost for the whole production process and/or result in odour nuisance when using wood fibre panels.

The volatile organic compounds VOC are either already present in the wood material or are released therefrom during processing or are formed according to the present knowledge by the degradation of non-saturated fatty acids, which again are degradation products of wood. Typical conversion products, which appear during processing, are for instance pentanal or hexanal but also octanal, octenal or 1-heptenal. In particular coniferous wood, which is used primarily for the production of medium-dense fibre panels or OSB-panels, contain large amounts of resins and fats, which cause the formation of volatile organic terpene compounds and aldehydes. VOC and aldehydes, like formaldehyde, can however also arise when using specific glues for the production of wood materials.

VOC-emission is accordingly exclusively based on wood related releases, which can be subdivided in primary emission of highly volatile wood ingredients such as terpenes or chemical degradation products, such as acetic acid, and so called secondary emissions, as for example higher aldehydes, like pentanal or higher carboxylic acids.

The VOC-emission can provide a considerable problem depending on the use of the wood based panels as for instance in form of OSB-panels and depending on the space load. Apart from that the emission of VOCs is a disadvantage for the wood fibre insulating material which is as such ecological in comparison to others, for instance mineral insulating materials.

Due to the mentioned reasons it is thus desired to reduce the release of volatile organic compounds from wood based panels.

Different approaches were chosen therefore in the past. DE 10 2007 050 935 A1 describes a process for producing wooden materials, wherein a gluten containing adhesive, a milk protein containing adhesive, a plant protein containing adhesive or derivatives of these adhesives were added to the wood fibres before pressing. Gluten containing adhesives are hide glue, bone glue, leather glue; milk protein containing adhesives are amongst others casein adhesives and plant protein containing adhesives are amongst others soy adhesives.

In US 2009/0130474 A1 aldehyde scavengers are added to a wood material or binding material. Bisulfites, pyrosulfites, as for example sodium hydrogensulfit, potassium hydrogensulfit, zinc sulfit, magnesium sulfit or aluminium sulfit and dithionites are described here as typical aldehyde scavengers.

According to WO 2010/136106 a zeolite as aldehyde scavenger is added to the mixture of wood fibres and adhesive during the production of wood material products. When using zeolites as aldehyde scavenger few disadvantages however arise. For instance relative high amounts of about 5% to atro wood have to be added.

SUMMARY OF THE INVENTION

The technical object of the present invention is to reduce the emissions, that means the emission of highly volatile organic compounds such as aldehydes and terpenes from wood based panels as for instance OSB-panels longterm to a level as low as possible.

According to an exemplary embodiment of the invention, modified nanoparticles are used in wood based panels, in particular OSB-panels, for reducing the emission of volatile organic compounds (VOCs) according to the invention, wherein the nanoparticles are modified with at least one compound of the general formula (I)

$$R_a SiX_{(4-a)} \quad (I)$$

where
X is H, OH or a hydrolysable moiety selected from the group comprising halogen, alkoxy, carboxyl, amino, monoalkylamino or dialkylamino, aryloxy, acyloxy, alkylcarbonyl,
R is a non-hydrolysable organic moiety R selected from the group comprising substituted and unsubstituted alkyl, substituted and unsubstituted aryl, substituted and unsubstituted alkenyl, substituted and unsubstituted alkinyl, substituted and unsubstituted cycloalkyl, substituted and unsubstituted cycloalkenyl, which may be interrupted by —O— or —NH—, and
where R has at least one functional group Q selected from a group comprising an epoxide, hydroxyl, ether, amino, monoalkylamino, dialkylamino, substituted and unsubstituted aniline, amide, carboxyl, alkinyl, acryloyl, acryloyloxy, methacryloyl, methacryloyloxy, mercapto, cyano, alkoxy, isocyanate, aldehyde, alkylcarbonyl, acid anhydride and/or phosphoric acid group, and
a=1, 2, 3, in particular 1 or 2.

The nanoparticles being used, in particular oxidic, hydroxidic or oxihydroxidic nanoparticles on the basis of $SiO_2$, $Al_2O_2$, $ZrO_2$, $TiO_2$, $SnO$, have a hydrophilic surface generated by hydroxy groups and can thus be chemically integrated into the wood fibre matrix by means of condensation. Furthermore, the hydrophilic particle surface allows a chemical bonding or coupling of the different silane compounds.

The functionalized silane compounds are bound via upstream hydrolysis and condensation process using acids or bases in the presence of water to the hydrophilic surface of the nanoscale particles.

The modified nanoparticles are preferably produced in a process, during which the particles are provided at first in aqueous solution with a suitable catalyst, in particular acid or base, and subsequently the appropriate silane compounds are added at temperatures at 50° C. and 80° C. Thereby hydrolysis with subsequent condensation of the silanes to the particle surface occurs, wherein about 90% of the silanes are bound to the particle surface.

During production of these particles an aqueous solution is preferably obtained, which contains nanoparticles with a silane layer (silane monolayer) on the surface and hydrolysed, but optionally not yet condensed silane monomers.

The existence of a silane layer (silane monolayer) on the particle surface results from the concentration of 0.1 to 0.8 mmol silane/g particle, preferably 0.4 to 0.6 mmol silane/g particle (measured by TEM).

The moiety X is preferably selected from a group containing fluorine, chlorine, bromine, iodine, $C_{1-6}$-alkoxy, in particular methoxy, ethoxy, n-propoxy and butoxy, $C_{6-10}$-aryloxy, in particular phenoxy, $C_{2-7}$-acyloxy, in particular acetoxy or propionoxy, $C_{2-7}$-alkylcarbonyl, in particular acetyl, monoalkylamino or dialkylamino with $C_1$ to $C_{12}$, in particular $C_1$ to $C_6$. In particular preferred hydrolysable groups are $C_{1-4}$-alkoxy groups, in particular methoxy and ethoxy.

The non-hydrolysable organic moiety R is preferably selected from a group comprising substituted and non-substituted $C_1$-$C_{30}$-alkyl, in particular $C_5$-$C_{25}$-alkyl, substituted and non-substituted $C_2$-$C_6$-alkenyl, substituted and non substituted $C_3$-$C_8$-cycloalkyl and substituted and non substituted $C_3$-$C_8$-cycloalkenyl. When using cycloalkyl and cycloalkenyl moieties, they are preferably bound by means of a $C_1$-$C_{10}$, in particular a $C_1$-$C_6$ alkyl linker to the Si atom. It is also conceivable that when using alkenyl or cycloalkenyl groups as moiety R they do not necessarily have to have a functional group Q. In these cases Q would be H accordingly.

In an exemplary embodiment the non hydrolysable moiety R is selected from the group comprising methyl, ethyl, n-propyl, isopropyl, n-butyl, s-butyl, t-butyl, pentyl, hexyl, cyclohexyl, vinyl, 1-propenyl, 2-propenyl, butenyl, acetylenyl, propargyl, substituted and unsubstituted butadienyl and substituted and unsubstituted cyclohexadienyl.

The term "non-hydrolysable organic moiety" is to be understood within the meaning of the present application as an organic moiety, which does not provide in the presence of water the formation of a OH— group or $NH_2$-group linked to the Si atom.

The at least one functional group Q, which is present in the organic non-hydrolysable moiety, comprises preferably an amino group, a monoalkylamino group, an aryl group, in particular a phenyl group, a hydroxy group, an acryl group, acryloxy group, methacryl group or a methacryloxy group, an epoxide group, in particular a glycidyl- or glycidyloxy-group, and/or an isocyano group. In particular preferred as a functional group Q is an amino group, hydroxy group and/or phenyl group.

As described, the non-hydrolysable moiety R has at least one functional group Q. Beyond that the moiety R can be substituted also with further moieties.

The term substituted when using "alkyl", "alkenyl", "aryl" etc. designates the substitution of one or multiple atoms, usually H atoms by one or multiple of the following substituents, preferably by one or two of the following substituents: halogen, hydroxy, protected hydroxy, oxo, protected oxo, $C_3$-$C_7$-cycloalkyl, bicyclic alkyl, phenyl, naphthyl, amino, protected amino, monosubstituted amino, protected monosubstituted amino, disubstituted amino, guanidino, protected guanidino, a heterocyclic ring, a substituted heterocyclic ring, imidazolyl, indolyl, pyrrolidinyl, $C_1$-$C_{12}$-alkoxy, $C_1$-$C_{12}$-acyl, $C_1$-$C_{12}$-acyloxy, acryloyloxy, nitro, carboxy, protected carboxy, carbomyl, cyano, methylsulfonylamino, thiol, $C_1$-$C_{10}$-alkylthiol and $C_1$-$C_{10}$-alkylsulfonyl. The substituted alkyl groups, aryl groups, alkenyl groups can be substituted once or multiple times and preferably once or twice with the same or different substituents.

The term "alkinyl" as used herein refers preferably to a moiety of the formula C≡C, in particular as "$C_2$-$C_6$-alkinyl". Examples for $C_1$-$C_{12}$-alkinyls include: ethinyl, propinyl, 2-butinyl, 2-pentinyl, 3-pentinyl, 2-hexinyl, 3-hexinyl, 4-hexinyl, vinyl as well as di- and tri-ines of linear and branched alkyl chains.

The term "aryl" as used herein, refers preferably to aromatic hydrocarbons, for example phenyl, benzyl, naphthyl or anthryl. Substituted aryl groups are aryl groups which are substituted with one or multiple substituents as defined above.

The term "cycloalkyl" comprises preferably the groups cyclopropyl, cyclobutyl, cyclopentyl, cyclohexyl and cycloheptyl.

The term "cycloalkenyl" comprises preferably substituted or non-substituted cyclic groups such as cyclopentenyl or cyclohexenyl. The term "cycloalkenyl" also covers cyclic groups with conjugated double bonds as for instance cyclohexadienes.

The term "alkenyl" comprises within the meaning of the present application groups with one or multiple double bonds, wherein the double bonds can also be present in conjugated form, as for instance butadienes.

The functional group Q is in a particular a group, which can undergo a reaction with an aldehyde group. For instance an amino group can react with an aldehyde under formation of a Schiff base. A hydroxy group can also react with an aldehyde under formation of an acetal or hemiacetal.

When using an aryl group as for example a phenyl group as functional group Q the aromatic group can function as a radical scavenger of radicals formed in the cause of the wood processing, in particular of aldehyde radicals and terpene radicals such that a scavenging of the highly volatile aldehyde and terpene can also take place here.

The use of alkenyls, in particular alkenyls with conjugated double bonds such as substituted and non-substituted butadienyl or cyxloalkenyls, in particular cycloalkenyls with conjugated double bond as for instance substituted and non-substituted cyclohexadienyl allows the conversion of highly volatile terpenes in a thermal Diels-Alder reaction. When selecting suitable diene compounds higher molecular cyclic compounds are thereby formed, which are not volatile any longer and thus remain within the wood.

In particular preferred silane compounds, which are used at present, are aminoethyl aminoethyl aminopropyl trimethoxysilane, aminopropyl trimethoxysilane, phenyl triethoxysilane.

The preferably used particles have a size between 2 and 400 nm, preferably between 2 to 100 nm, in particular preferably between 2 to 50 nm. The particles can be in particular of oxidic, hydroxidic or oxihydroxidic nature, which can be synthesized by different methods as for example ion exchange process, plasma process, sol-gel process, grinding or also flame separation. In a preferred embodiment particles on the basis of $SiO_2$, $Al_2O_3$, $ZrO_2$, $TiO_2$, SnO are used, whereby $SiO_2$ particles are in particular preferred.

The presently used nanoparticles can have a specific surface of 50 to 500 $m^2/g$, preferably of 100 to 400 $m^2/g$, in particular preferably of 200 to 300 $m^2/g$. The determination of the specific surface is being done by measuring the absorption of nitrogen according to the BET method of Brunauer, Emmett and Teller.

It is in particular preferred, if the modified nanoparticles are used for reducing aldehydes released from wood shavings used in the wood based panel, in particular $C_1$-$C_{10}$ aldehydes, in particular preferably formaldehyde, acetaldehyde, pentanal, hexanal and others. As explained in detail above a release of aldehydes occurs in particular during the wood processing.

It is also preferred, if the modified nanoparticles are used for reducing terpenes released from wood shavings used in the wood based panels, in particular $C_{10}$-monoterpenes and $C_{15}$-sesquiterpenes, in particular preferably acyclic or cyclic monoterpenes.

Typical acyclic terpenes are terpene hydrocarbons such as mycrene, terpene alcohols such as geraniol, linalool, ipsenol and terpenaldehydes such as citral. Typical representatives of monocyclic terpenes are p-methan, terpinen, limonene or carvon and typical representatives of bicyclic terpenes are caran, pinan, bornan, wherein in particular 3-caren and α-pinen are of importance. Terpenes are ingredients of tree resins and are therefore in particular present in tree species containing a lot of resin such as pine or spruce.

The modified particles are used in a process for producing a wood based panel, in particular an OSB-panel, having reduced emission of volatile organic compounds (VOCs), wherein the process comprises the following process steps:
a) producing wood chips from suitable woods,
b) converting the wood chips to wood shavings,
c) intermediately storing of the wood shavings, in particular in silos or bunkers,
d) drying the wood shavings,
e) sorting or sifting the wood shavings according to the size of the wood shavings,
f) if appropriate, further comminuting the wood shavings,
g) applying the wood shavings onto a conveyor belt by means of wind sifting and/or throw sifting forming a mat of scattered material,
h) pressing the wood shavings arranged on the conveyor belt, whereby at least a suspension comprising the modified nanoparticles as described above before, during and/or after one of the steps b) to h) is added.

In the present method a suspension containing the modified nanoparticles is therefore used. Thereby a suspension in form of an aqueous solution having a proportion of modified nanoparticles of at least 20 weight %, preferably of at least 40 weight %, in particular preferably of at least 50 weight % is used.

According to the process the modified particles can be mixed with the wood shavings at any time of the production process of the wood based panels. It is also conceivable, that the suspension containing the modified particles is applied onto the wood shavings at multiple locations during the process.

A suitable glue or adhesive can also be mixed with the wood shavings or can be sprayed onto the wood shavings at any time of the production process.

In addition to the above mentioned process steps the wood shavings are purified from impurities for instance during a dry cleaning or wet cleaning preferably before their comminution.

In an exemplary embodiment of the process a separation of the produced shavings into top and middle layer takes place. This is being done by a sieving during which the shaving material is sorted depending on the size. The middle layer comprises thereby preferably smaller wood shavings and the top layer comprises larger wood shavings.

Subsequently in a further embodiment the gluing of the top and middle layer is carried out by spraying a suitable glue under high pressure and a subsequent mixing in a coil. The gluing and mixing occurs separate from top and middle layer.

The processes for producing OSB-panels differ from the process for shipboard production or fibreboard production in particular in respect to the size and characteristics of the used wood shavings as well as in respect to the used pressures and temperatures. The essential process procedure and thus the order of the process steps are however similar for all boards and thus known to the person skilled in the art.

The suspension containing the modified nanoparticles can be introduced in different ways into the wood based panel during the production process.

The suspension containing the modified nanoparticles can be mixed with the glue or adhesive to be applied, can be applied simultaneously to the glue or adhesive onto the wood shavings, can be sprayed onto the wood shavings before they are dried or can be sprayed onto the mat of scattered wood shavings prior to pressing.

In an exemplary embodiment the addition of the suspension of a purely aqueous nanoparticle solution occurs thus simultaneously to the gluing of the top layer and/or middle layer.

In a further exemplary variant the addition or primary mixing of a mere aqueous nanoparticle solution is done to the glue and the subsequent gluing of the shavings is done with said mixture of glue with nanoparticles. In this context it is also conceivable to add the aqueous nanoparticle solution during the glue production.

According to the present process it is also possible to add a suspension of a mere aqueous nanoparticle solution before drying the shavings and thus before scattering to said shavings, for instance by means of spraying.

In a yet further exemplary variant it is possible to spray the surface of the mat of scattered wood shavings with the aqueous nanoparticle solution.

Object of the present invention is also a wood based panel, in particular an OSB-wood based panel, obtainable in the above described process.

The wood based panel producible according to the present process has an aldehyde emission, in particular hexanal emission of less than 1000 µg/m$^3$, in particular of less than 800 µg/m$^3$, in particular preferably of less than 500 µg/m$^3$ and a terpene emission, in particular of 3-caren of less than 2000 µg/m$^3$, in particular of less than 1500 µg/m$^3$. The provided values relate in each case to measurements in a microchamber, which is commercially available.

DESCRIPTION OF THE INVENTION

The invention is described in the following in more detail by means of multiple examples.

The VOC-emission of multiple OSB-examples was investigated in the microchamber. The sample 0 is thereby a zero sample. Different modified nanoparticles were added to all the other samples 1-3, which were modified on the surface with different functional groups according to the following table 1.

TABLE 1 modified nanoparticles used in the samples

| Sample or panel | Silane | [mmol] Silane/ g SiO2 Particle |
|---|---|---|
| 0 | — | — |
| 1 | Aminoethyl aminoethyl aminopropyl trimethoxysilane | 0.42 |
| 2 | Aminopropyl trimethoxysilan | 0.45 |
| 3 | Phenyl triethoxysilan | 0.46 |

Multiple OSB-test panels were produced with the lab press in the format 12 mm×300 mm×300 mm and a bulk density of 650 kg/m$^3$. In case of the first panel 0 no additive was added. The dosage was done only into the top layer. For this purpose the glued strands (12% MUPF) were taken from the production line and were evenly mixed with the respective additive and subsequently scattered. The dosage takes place in each case with 40 g modified particles (except in case of sample 0) per 140 g glued top layer. The middle layer was not modified, but taken from the line (glued with PMDI).

The emission of the OSB-panels is provided thereby in form of the emission rate with the unit [µg/m$^3$] wherein a surface specific airing rate q=1 m$^3$/(m$^2$*h) is considered.

In the following the effect of the modified particles regarding the VOC-substances n-hexanal as representative of the aldehydes and 3-caren as representative of the monocyclic terpenes is described.

The reduction rate of hexanal and 3-caren when using the different modified particles are summarised in the following table 2.

TABLE 2 emission rates of hexanal and 3-caren of the samples investigated

| Sample | n-Hexanal [µg/m3] | 3-Caren [µg/m3] |
|---|---|---|
| 0 | 872 | 1972 |
| 1 | 295 | 1941 |
| 2 | 434 | 1086 |
| 3 | 733 | 1356 |

A reduction of n-hexanal compared to the zero sample is recognizable with sample 1 by about 66%, with sample 2 by about 50% and sample 3 by about 16%. The reduction of 3-caren is with sample 2 at about 45% and sample 3 at about 31%.

The use of the modified nanoparticles provides thus depending on the silane compounds used for modification a reduction of the emitted hexanal and 3-caren. The different reduction rates of hexanal and 3-caren when using the modified nanoparticles can be obviously ascribed to the different functionalized silanes. The strong reduction of hexanal in samples 1 and 2 can be explained by the reaction of the free amino groups of a functionalized particle with the aldehyde group of the hexanal under formation of a Schiff Base.

The invention claimed is:

1. A method for reducing the emission of volatile organic compounds (VOC) from a wood based panel by treating a wood-based panel comprising applying to the wood based panel nanoparticles, modified with at least one compound of the general formula (I)

$$R_a SiX_{(4-a)} \qquad (I)$$

wherein

X is H, OH or a hydrolysable moiety selected from the group consisting of halogen, alkoxy, carboxyl, amino, monoalkylamino or dialkylamino, aryloxy, acyloxy, and alkylcarbonyl;

R is a non-hydrolysable organic moiety R selected from the group consisting of substituted and unsubstituted alkyl, substituted and unsubstituted aryl, substituted and unsubstituted alkenyl, substituted and unsubstituted alkinyl, substituted and unsubstituted cycloalkyl, and substituted and unsubstituted cycloalkenyl, which may be interrupted by —O— or —NH—, and wherein R has at least one functional group Q selected from a group consisting of an epoxide, hydroxyl, ether, amino, monoalkylamino, dialkylamino, substituted and unsubstituted aniline, amide, carboxyl, alkynyl, acryloyl, acryloyloxy, methacryloyl, methacryloyloxy, mercapto, cyano, alkoxy, isocyanate, aldehyde, alkylcarbonyl, acid anhydride, aryl, and phosphoric acid group, and wherein a=1, 2, or 3.

2. The method according to claim 1, wherein X is selected from the group consisting of fluorine, chlorine, bromine, iodine, $C_{1-6}$-alkoxy, $C_{6-10}$-aryloxy, $C_{2-7}$-acyloxy, $C_{2-7}$-alkylcarbonyl, and monoalkylamino or dialkylamino with $C_1$ to $C_{12}$.

3. The method according to claim 1, wherein R is selected from the group consisting of substituted and unsubstituted $C_{1-30}$-alkyl, substituted and unsubstituted $C_{2-6}$-alkenyl, substituted and unsubstituted $C_{3-8}$-cycloalkyl, and substituted and unsubstituted $C_{3-8}$-cycloalkenyl.

4. The method according to claim 1, wherein R is selected from the group consisting of methyl, ethyl, n-propyl, isopropyl, n-butyl, s-butyl, t-butyl, pentyl, hexyl, cyclohexyl, vinyl, 1-propenyl, 2-propenyl, butenyl, acetylenyl, propargyl, substituted and unsubstituted butadienyl, and substituted and unsubstituted cyclohexadienyl.

5. The method according to claim 1, wherein the functional group Q is an amino group, a monoalkylamino group, an aryl group, a hydroxyl group, an acryl group, acryloxy group, methacryl group or a methacryloxy group, an epoxide group, and/or an isocyano group.

6. The method according to claim 1, wherein the functional group Q is an amino group, hydroxyl group and/or phenyl group.

7. The method according to claim 1, wherein the nanoparticles have a size between 2 and 400 nm.

8. The method according to claim 1, wherein the nanoparticles have a specific surface area of 50 to 500 $m^2$/g.

9. The method according to claim 1, wherein the nanoparticles are oxidic, hydroxidic or oxyhydroxidic nanoparticles.

10. The method according to claim 1, wherein the modified nanoparticles reduce the level of aldehydes released from wood shavings used in the wood based panel.

11. The method according to claim 1, wherein the modified nanoparticles reduce the level of terpenes released from wood shavings used in the wood based panel.

12. A process for producing a wood based panel having reduced emission of volatile organic compounds (VOCs), comprising the following process steps:
 a) producing woodchips from suitable woods;
 b) converting the woodchips to wood shavings;
 c) intermediately storing the wood shavings;
 d) drying the wood shavings;
 e) sorting or sifting the wood shavings according to the size of the wood shavings;
 f) applying the wood shavings to a conveyor belt by means of wind-sifting and/or throwsifting, thereby forming a mat of scattered material; and
 g) pressing the wood shavings arranged on the conveyor belt,
wherein
at least one suspension comprising nanoparticles modified with at least one compound of the general formula (I) is added before, during and/or after one of steps b) to g), and further wherein
the suspension comprising the modified nanoparticles is mixed with at least one glue to be applied, is applied to the wood shavings simultaneously with the glue to be applied, sprayed onto the wood shavings before they are dried, or sprayed onto the mat of scattered wood shavings prior to pressing.

13. The process according to claim 12, wherein the suspension is in the form of an aqueous solution having a proportion of modified nanoparticles of at least 40% by weight.

14. A wood based panel produced according to the process of claim 12.

15. The process according to claim 12, wherein the suspension is an aqueous solution comprising, by weight, at least 20% modified nanoparticles.

* * * * *